United States Patent [19]

Röhm

[11] 4,362,306
[45] Dec. 7, 1982

[54] SPLIT-JAW LATHE CHUCK

[76] Inventor: Günter H. Röhm, Heinrich-Röhm-Strasse 50, 7927 Sontheim, Fed. Rep. of Germany

[21] Appl. No.: 159,654

[22] Filed: Jun. 16, 1980

[30] Foreign Application Priority Data

Jul. 26, 1979 [DE] Fed. Rep. of Germany ....... 2930721

[51] Int. Cl.³ ............................................. B23B 31/16
[52] U.S. Cl. ..................................... 279/121; 279/123
[58] Field of Search ................ 279/110, 123, 121, 114

[56] References Cited

U.S. PATENT DOCUMENTS 1,886,083 11/1932 Church ................................ 279/123
4,270,763 6/1981 Rohm ................................... 279/123

Primary Examiner—Z. R. Bilinsky
Attorney, Agent, or Firm—Karl F. Ross

[57] ABSTRACT

A chuck has a chuck body rotatable about a chuck axis and subdivided along a plane perpendicular to this chuck axis into a front chuck part and a rear chuck part integrally connected together. The rear chuck part is formed with a plurality of angularly spaced and radially extending rear T-section guide grooves opening axially forwardly at the plane and each having a pair of radially extending sides each in turn formed with a step extending parallel to and backwardly offset from the plane. The front chuck part is formed in axial alignment with the rear guide grooves with respectively angularly spaced and radially extending guide grooves opening axially forwardly. The front chuck has a backwardly facing planar face lying on the plane and forwardly closing the rear guide groove. Respective webs form the bases of the backwardly closed front guide grooves, and are formed with radially throughgoing apertures substantially smaller than the respective front guide grooves. Respective rear jaw parts are radially displaceable in the rear guide grooves and each have a pair of oppositely projecting ridges each in turn having a rear face riding on the respective step and a front face riding on the rear face of the front chuck part.

10 Claims, 3 Drawing Figures

SPLIT-JAW LATHE CHUCK

FIELD OF THE INVENTION

The present invention relates to a split-jaw lathe chuck. More particularly this invention concerns a lathe chuck whose jaws are subdivided into front and rear parts that can be coupled together for joint radial displacement or decoupled for adjustment or changing of the front jaw parts.

BACKGROUND OF THE INVENTION

A split-jaw chuck such as described in my patent 4,200,300 or in my application Ser. No. 040,126 filed July 24, 1980 (now abandonded) has a chuck body that is rotatable about a chuck axis formed with a plurality of angularly spaced and radially extending front guides and a plurality of angularly spaced and radially extending rear guides. Respective front jaw parts are radially displaceable in the front guides and project forwardly and axially from the chuck body and respective rear jaw parts are radially displaceable in the rear guides. Means is provided including at least one operating element that is engageable with the rear jaw parts for radially displacing same jointly in the chuck body in the respective rear guides. In addition respective coupling members are engageable between the rear jaw parts and the respective front jaw parts and are each displaceable into a coupling position engaging both the respective parts for coupling same together for joint radial displacement and a decoupling position for relative radial displacement of the respective parts.

Such an arrangement has the considerable advantage that even though the rear jaw parts are only moved through a relatively short radial stroke by the operating member, which is normally itself the piston rod of a heavy-duty hydraulic ram, the front jaw parts can easily be set at virtually any radial position on the chuck body. Thus the coupling members can be displaced into their decoupling position and the front jaw parts can be displaced to spacing slightly larger than that required to hold a predetermined workpiece. The coupling members are then displaced back into their coupling positions so that the operating member of the chuck, which is normally constituted as a so-called power chuck, can move them sufficiently to clamp the workpiece in place.

As a rule the chuck body of such an arrangement is formed basically of a short cylindrical piece of steel whose one face is machined with radially extending grooves constituting the front guides and whose back face is similarly machined with radially extending grooves constituting the back guides. These grooves all open radially outwardly to facilitate machining of the chuck body and to allow the respective jaw parts to be mounted in place. To this end the jaw parts are typically formed of rectangular section, seen parallel to their respective directions of radial displacement. Once assembled together a relatively thin plate is bolted over the back face of the chuck body to hold the rear jaw parts in place.

Such a system has the disadvantage that the chuck body is occasionally stressed so very much that the relatively thin webs separating the grooves constituting the front guides from the grooves constituting the rear guides fail. In this case the chuck body comes apart, potentially causing serious injury and at the very least destroying a very valuable machine tool and the workpiece being held thereby. Such chucks are subjected to very large forces, as the axial displacement of the operating member is converted into radial displacement and stressing of the jaws and associated structure.

OBJECTS OF THE INVENTION

It is therefore an object of the present invention to provide an improved split-jaw lathe chuck.

Another object is to provide such a chuck which is substantially sturdier and cheaper to construct than the known split-jaw lathe chucks.

SUMMARY OF THE INVENTION

These objects are attained according to the instant invention by forming the chuck body of a front chuck part and a rear chuck part, subdivided and joined along a plane extending perpendicular to the chuck axis. The rear guide grooves are formed in the rear chuck part and open axially forwardly, but are closed axially backwardly by webs unitarily formed with the rear chuck part. Furthermore each such rear guide groove has a pais of substantially parallel and radially extending sides, each formed with a step, so as to impart a T-section to the rear guide grooves. The rear jaw parts are similarly of T-section, each having a pair of oppositely directed ridges, a rear face bearing on the respective step, and a front face riding on the rear face of the front chuck part. The front chuck part is formed with a plurality of radially extending and forwardly open grooves constituting the front guides for the front jaw parts, and these grooves are radially backwardly closed by respective webs of the front chuck part. These webs are each formed with a relatively small axially throughgoing hole through which extends the respective coupling member. What is more the rear guides are radially closed outwardly from the axis by above-mentioned respective webs of the rear chuck part.

Thus the chuck according to the instant invention is extremely rugged, as the two parts forming the chuck body are both relatively massive and are connected together in such a way that they form a very rugged assembly. The webs axially backwardly closing the front guide grooves and radially outwardly closing the rear guide grooves ensure excellent force transmission between the various portions of the chuck body so that failure of these elements is virtually out of the question. Webs radially outwardly closing the rear guide grooves completely prevent any elastic spreading of the rear chuck part at the guide grooves so that no force is lost by such elastic deformation of the body, and similarly mental fatigue is avoided. Furthermore the front jaw parts seen radially are supported at both sides of the window in their guide grooves, in a region in which the chuck body can easily withstand considerable force so that the moment effective on each front jaw part can be withstood virtually without deformation by the chuck body.

A further advantage of the invention is that the steps formed in the rear guide grooves are relatively shallow. Thus they can be relatively easily cut into the front face of the rear chuck part. The axial dimension of the rear chuck part only exceeds the axial dimension of the rear jaw parts by the thickness of the web axially backwardly closing the rear guide grooves. Thus even if the rear jaw parts are of relatively large cross section seen in the direction perpendicular to their displacement direction, the chuck can be axially relatively short. Using such rear jaw parts of large cross section seen parallel to the chuck axis allows the hole that extends through them for the coupling member and the coupling member itself to be relatively large so that considerable forces can be transmitted between the rear jaw part and the respective front part by each coupling member without weakening the rear jaw member.

A further advantage of this invention is that the web radially outwardly closing the rear guide grooves makes it completely impossible for the rear jaw parts to be displaced radially out of the chuck. This can avoid one type of potentially extremely dangerous accidents. Furthermore each front jaw part can completely cover the respective axially open aperture between the respective front guide groove and the respective rear guide groove so as to completely eliminate the possibility of metal chips or the like working their way into the interior of the chuck. According to this invention each front jaw part completely covers the respective aperture in any of its possible positions.

Each front jaw part can be secured via the respective aperture to the respective rear jaw part in several ways, for instance, by means of an externally operable coupling member as described above. It is, of course, also possible simply to screw together the two jaw parts when it is not necessary to be able to uncouple them readily. The connection-together of the jaw parts of each jaw can be effected from the front side of the chuck if desired. It is also possible to make this connection from the back side of the chuck and to this end to form a hole in the rear face of the rear chuck part which gives access to an axially displaceable coupling member as described above. Such an access hole need not be very large so that it will not appreciably affect the rigidity and stiffness of the chuck according to this invention. It is further possible to employ a system such as that described in my above-cited patent application, whose entire disclosure is herewith expressly incorporated by reference, with a plurality of radially displaceable actuating elements each displaceable between a radial outer position camming the respective coupling member into the decoupling position. Such actuating elements would project radially outwardly through the webs outwardly closing the ends of the grooves, but would only need to pass through relatively small holes in these webs so that, once again, it would not affect the rigidity of the system according to this invention.

As mentioned above, both the rear jaw parts and the rear guide grooves are of complementary T-section. According to this invention, however, the portion of each ridge or part extending axially backwardly from between the respective ridges that ride between the steps and the rear face of the front jaw part are received with modest play within the respective groove. Thus each rear jaw part is wholly guided on the steps and on the rear face of the front jaw part, so that it is not necessary to machine the rear guide groove to extremely close tolerance. Obviously this cuts production costs.

According to a further feature of this invention one of the chuck parts is formed with an axially projecting rim on its outer periphery that is received within an axially open groove of the other chuck part. The rim can be provided on the back face of the front chuck part and the groove on the front face of the rear chuck part or vice-versa. Such an arrangement ensures exact centering of the two chuck parts relative to each other and furher adds to the overall rigidity of the assembly once the two chuck parts are bolted together and to the head stock of the lathe they are mounted on.

SPECIFIC DESCRIPTION

Figures 1, 2, 3:
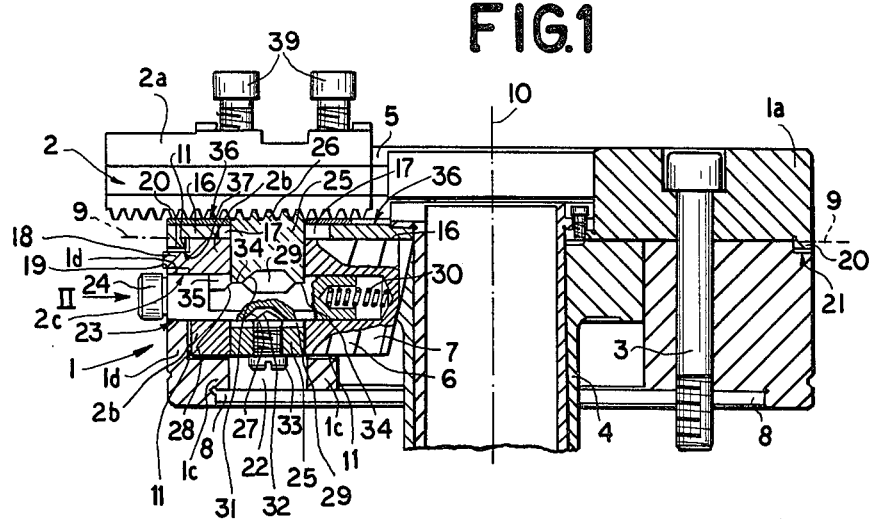
FIG. 1 is an axial section through a chuck according to this invention.
FIG. 2 is a view partly in section taken radially in the direction of arrow II of FIG. 1.
FIG. 3 is a cross section through the chuck.

A chuck according to the instant invention has a chuck body 1 rotatable about and centered on an axis 10 and comprised of a front chuck part 1a and a rear chuck part 1b secured together by means of bolts 38 (FIG. 2) and normally secured by bolts 3 to the headstock of a lathe which fits in a recess 8 formed in the rear part 1b. The chuck body 1 normally carries three angularly equispaced jaws 2 each formed of a front jaw part 2a and a rear jaw part 2b. A drive member 4 which may be operated by pressure directly in the chuck body 1 is connected to the piston rod of a hydraulic cylinder and is formed with hooks 6 that engage hooks 7 on the rear jaw parts 2b so as to radially displace the jaws 2 as the operating member 4 is axially displaced. Jaw blanks such as described in my above-cited copending application can be secured by bolts 39 to the front jaw parts 2a.

The two chuck parts 1a and 1b are joined at a plane 9 at the rear face of the front chuck part 1a and the front face of the rear chuck part 1b. The jaw parts 2a lie wholly axially ahead of this plane 9 and the jaw parts 2b lie wholly behind it.

The rear chuck part 1b is formed with rear guides 11 of T-section, each having confronting grooves 12 defined by forwardly facing step surfaces 14a and inwardly facing side surfaces 15. The rear face 14b of the front chuck part 1a forwardly closes the T-section rear guide groove 11. Axially backwardly the rear guide groove is closed below the level of the surface 14a by another web 1d, so that the rear chuck part 1b is very stiff.

The front chuck part 1a is formed with radially extending, angularly equispaced, and forwardly open H-section front guide grooves 5 of section complementary to that of the front jaw parts 2a. These front guide grooves 5 have bases 3b parallel to the plane 9, the grooves 5 being closed axially backwardly by a web 16 of the jaw part 1a, but are radially inwardly and radially outwardly open for easy mounting and removal of the front jaw parts 2a. An axially throughgoing hole 17 is formed in the web 16, but has a radial length substantially shorter than that of the jaws 2a so that these jaws 2a always cover the respective windows or apertures 17.

The rear jaw part 1b is formed with a pair of radially outwardly projecting ridges 13 received in the grooves 12 defined between the surfaces 14a, 15, and 14b, but as is visible in FIG. 2, is spaced somewhat inwardly from the guide groove 11 that therefore need not be machined to tolerances as close as those of the surfaces 14a and 15. The portion 19 between the ridges 13 is solid, so that in effect the two planar front surfaces 14b of the jaw parts 2b are coplanar and extend entirely across the front faces of the jaw parts 2b.

A coupling member 25 for each jaw 2 has teeth 26 that project radially forwardly of the floor 3b of the respective front guide groove 5. Each such coupling member 25 is formed with a radially throughgoing passage 29 through which extends an actuating pin 24 urged radially outwardly by a spring 30. This pin 24, in the manner described in my above-cited copending application, has cam surfaces 27 and 28 that can coact with similar surfaces 31 and 32 on the coupling member 25 or a screw 33 mounted thereon, and has surfaces 34 that can coact with similar such surfaces on the rear face of the coupling member 25. Thus this pin 24 can be moved radially inwardly to cam the coupling member 25 back out of mesh with the teeth on the rear face of the front jaw part 2a, but when moved radially outwardly not only cams the coupling member 25 forwardly into good force-transmitting contact with the jaw part 2a, but locks it in place by planar engagement of the surfaces 34 which lie in a plane perpendicular to the axis 10. Radially outwardly effective centrifugal forces on the pin 24 will ensure that this locking-together is increasingly effective with increasing rotation speed of the chuck body 1.

The two guide grooves 12 open radially outwardly on the outer surface of the rear chuck part 1b. They are therefore formed directly in the front face of the rear body 1b. Between the two grooves 12 of each guide 11 the outer web or wall 1d of the rear body 1b is cut away at 18. The rear jaw parts 2b are provided with a transverse flange 19 which engages in this cutout 18 and which extends radially outwardly beyond the outer surface 2c of the rear back part and which bridges the two flanges or ridges 13. This transverse flange 19 is so constructed that it closes the cutout 18 in every normal position of the rear jaw part 2b.

The front chuck part 1a has a rearwardly extending annular rim 20 received in a correspondingly forwardly opening cutout 21 of the front face of the rear jaw part 2b. The structure ensures perfect centering of the parts 1a and 1b together. The flange 19 of each of the rear jaw parts 2b is notched at 37 to accommodate the rim 20.

The rear jaw part 1b is formed in axial line with the window 17 with an aperture 22 and radially crossing this aperture 22 with a radial passage or guide hole 23. The coupling member 25 is axially displaceable in the hole 22 and the operating member 24 in the hole 23.

The chuck according to the instant invention is extremely rugged, while not being any more difficult or expensive to manufacture than the prior-art chuck. Only the surfaces 14a, 14b, and 15 for the rear parts 2b need be carefully machined, as otherwise the guides 11 receive the rest of the rear jaw parts 2b with slight clearance.

Thus with the system according to the instant invention the chuck body 1 will be extremely rigid, capable of withstanding enormous twisting and torsional forces. The various webs holding the chuck together, which are not provided on the prior-art systems, are capable of withstanding these forces completely without deformation of the chuck so that elastic metal fatigue will not set in. At the same time the chuck according to the instant invention is no more expensive to manufacture that the prior-art chuck and, indeed, can be produced at a lower cost for the reasons outlined above.

I claim:

1. A chuck comprising:
    a chuck body rotatable about a chuck axis and subdivided along a plane substantially perpendicular to said chuck axis into a front chuck part and a rear chuck part connected integrally together, said chuck body being formed in said rear chuck part with a plurality of angularly spaced and radially extending rear T-section guide grooves opening axially forwardly at said plane and each having a pair of radially extending sides each in turn formed with a step extending parallel to and backwardly offset from said plane, said front chuck part being formed in axial alignment with said rear guide grooves with respective angularly spaced and radially extending front guide grooves opening axially forwardly, said front chuck part having a backwardly facing planar face lying on said plane and forwardly closing said rear guide grooves and respective webs forming the bases of and backwardly closing said front guide grooves, said webs forming respective parts of said backwardly facing face and each being formed with a radially throughgoing aperture substantially smaller than the respective front guide groove:
    respective rear jaw parts radially displaceable in said rear grooves and each having a pair of oppositely projecting ridges each in turn having a rear face riding on the respective step and a front face riding on said back face of said front chuck part;
    means including at least one operating element engageable with said rear jaw parts for radially displacing same jointly in said chuck body in the respective rear guide grooves;
    respective front jaw parts projecting forwardly and axially from said chuck body and radially displaceable therein in said front guide grooves and
    means including respective coupling members engageable through said apertures between said rear jaw parts and the respective front jaw parts and each displaceable between a coupling position engaging both of the respective jaw parts for coupling same together for joint radial displacement and a decoupling position for relative radial displacement of the respective jaw parts.

2. The chuck defined in claim 1 wherein said rear chuck part is formed at each of said rear guide grooves between the sides thereof and between the steps thereof and said plane with a notch opening at said plane and opening radially outwardly, said rear jaw parts having transverse flanges interconnecting said ridges and projecting radially outwardly into the respective notches, said rear jaw parts being formed with webs radially outwardly closing said rear guide grooves except at said notches.

3. The chuck defined in claim 1 wherein said rear jaw parts are received with play in said rear guide grooves to the axial side of said steps away from said front jaw part.

4. The chuck defined in claim 1 wherein said front chuck part is formed centered on said axis with an annular rim projecting axially backwardly past said plane, said rear jaw part being formed with a forwardly open annular groove complementarily receiving said rim.

5. The chuck defined in claim 1 wherein said rear chuck part is formed with other respective apertures in axial line with said apertures of said front chuck part, said coupling members being engaged through said apertures with the respective jaw parts.

6. The chuck defined in claim 5, further comprising an operating member radially displaceable in each of said rear jaw parts and engageable with the respective coupling member to displace same between the respective positions.

7. The chuck defined in claim 1 wherein said front guide grooves have planar bases parallel to said plane, said front jaw parts riding directly on said planar bases.

8. The chuck defined in claim 1 wherein said rear jaw parts are, seen radially, of T-section, each having a central leg received with play in respective guide grooves and a pair of arms received substantially without play in the respective guide groove.

9. The chuck defined in claim 8 wherein said rear chuck part is formed with webs radially outwardly closing said rear guide grooves level with said central legs.

10. The chuck defined in claim 1 wherein said front jaw parts and front guide grooves are of complementary H-section.

* * * * *